United States Patent
Sheridan

(10) Patent No.: US 10,480,350 B2
(45) Date of Patent: Nov. 19, 2019

(54) GEARED GAS TURBINE ENGINE WITH OIL DEAERATOR AND AIR REMOVAL

(71) Applicant: United Technologies Corporation, Farmington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 29 days.

(21) Appl. No.: 16/108,540

(22) Filed: Aug. 22, 2018

(65) Prior Publication Data

US 2018/0355759 A1 Dec. 13, 2018

Related U.S. Application Data

(63) Continuation of application No. 14/794,866, filed on Jul. 9, 2015, now Pat. No. 10,060,289.

(60) Provisional application No. 62/030,105, filed on Jul. 29, 2014.

(51) Int. Cl.
| | |
|---|---|
| *F01D 25/18* | (2006.01) |
| *F01D 25/20* | (2006.01) |
| *F02C 7/06* | (2006.01) |
| *B01D 19/00* | (2006.01) |

(52) U.S. Cl.
CPC ......... *F01D 25/18* (2013.01); *B01D 19/0068* (2013.01); *B01D 19/0073* (2013.01); *F01D 25/20* (2013.01); *F02C 7/06* (2013.01); *F05D 2260/609* (2013.01); *Y02T 50/671* (2013.01)

(58) Field of Classification Search
CPC .......... F01D 25/18; F01D 25/20; F01D 25/22; F02C 7/06; F05D 2260/609
See application file for complete search history.

(56) References Cited

U.S. PATENT DOCUMENTS

| | | | |
|---|---|---|---|
| 3,722,624 | A | 3/1973 | Buckland |
| 5,472,383 | A | 12/1995 | McKibbin |

(Continued)

FOREIGN PATENT DOCUMENTS

WO 2014066815 A1 5/2014

OTHER PUBLICATIONS

European Search Report for European Application No. 15178688.6 completed Dec. 23, 2015.

(Continued)

*Primary Examiner* — Steven M Sutherland
*Assistant Examiner* — Thuyhang N Nguyen
(74) *Attorney, Agent, or Firm* — Carlson, Gaskey & Olds, P.C.

(57) ABSTRACT

A gas turbine engine has a fan drive turbine for driving a gear reduction. The gear reduction drives a fan rotor. A lubrication system supplies oil to the gear reduction, and includes a lubricant pump to supply an air/oil mixture to an inlet of a deaerator. The deaerator includes a separator for separating oil and air, delivering separated air to an air outlet, and delivering separated oil back into an oil tank. The separated oil is first delivered to a pipe outwardly of the oil tank, and then into a location beneath a minimum oil level in the tank. Air within the oil tank moves outwardly through an air exit into the deaerator. A method of designing a gas turbine engine is also disclosed.

19 Claims, 8 Drawing Sheets

(56) References Cited

U.S. PATENT DOCUMENTS

| | | | |
|---|---|---|---|
| 6,223,616 B1 * | 5/2001 | Sheridan | F16H 1/2827 |
| | | | 184/6.12 |
| 7,435,290 B2 * | 10/2008 | Lane | F01D 25/18 |
| | | | 55/460 |
| 8,201,664 B2 | 6/2012 | Brouillet et al. | |
| 8,602,165 B2 * | 12/2013 | Szolomayer | B01D 45/16 |
| | | | 137/38 |
| 2008/0179227 A1 | 7/2008 | Saito | |
| 2009/0120296 A1 | 5/2009 | Saito | |
| 2009/0235630 A1 | 9/2009 | Norris | |
| 2010/0196170 A1 | 8/2010 | Chen et al. | |
| 2013/0153672 A1 * | 6/2013 | Price | B01D 17/00 |
| | | | 239/1 |
| 2014/0140824 A1 | 5/2014 | Sheridan | |

OTHER PUBLICATIONS

Linke-Diesinger, Andreas, An Introduction to Systems Functions, 2008, Springer Berlin Heidelberg, pp. 49-65.
Safran Snecma, CFM56-7B, 2011, Snecma, p. 1.
Pratt & Whitney, PW4000-94 Engine, Jan. 26, 2013, Pratt & Whitney, pp. 1-2.

* cited by examiner

GEARED GAS TURBINE ENGINE WITH OIL DEAERATOR AND AIR REMOVAL

CROSS-REFERENCE TO RELATED APPLICATION

This application is a continuation of U.S. patent application Ser. No. 14/794,866 filed on Jul. 9, 2015, which claims priority to U.S. Provisional Patent Application No. 62/030,105, filed Jul. 29, 2014.

BACKGROUND OF THE INVENTION

Gas turbine engines are known and, typically, include a fan delivering air into a bypass duct as propulsion air. The fan also delivers air into a core engine where it passes to a compressor. The air is compressed in the compressor and delivered downstream into a combustion section where it is mixed with fuel and ignited. Products of this combustion pass downstream over turbine rotors driving them to rotate.

Historically, the fan rotor and a fan drive turbine rotor have been driven at the same speed. This placed a restriction on the desirable speed of both the fan and the fan drive turbine.

More recently, it has been proposed to provide a gear reduction between the fan drive turbine and the fan rotor.

The gear reduction is a source of increased heat loss. As an example, a geared turbofan engine creates about twice as much heat loss as a non-geared turbofan engine. In addition, the weight of the engine increases due to the weight of the gear reduction.

It has typically been the case that a designer of a gas turbine engine sizes an oil tank such that the oil can sit in the oil tank long enough to de-aerate. On a normal turbofan engine, this had been approximately at least ten seconds.

SUMMARY OF THE INVENTION

In a featured embodiment, a gas turbine engine has a fan drive turbine for driving a gear reduction. The gear reduction drives a fan rotor. A lubrication system supplies oil to the gear reduction, and includes a lubricant pump to supply an air/oil mixture to an inlet of a deaerator. The deaerator includes a separator for separating oil and air, delivering separated air to an air outlet, and delivering separated oil back into an oil tank. The separated oil is first delivered into a pipe outwardly of the oil tank, and then into a location beneath a minimum oil level in the tank. Air within the oil tank moves outwardly through an air exit into the deaerator.

In another embodiment according to the previous embodiment, the deaerator has an air outlet, and an exit guide extending into the deaerator from the air outlet. The deaerator inlet delivers the air/oil mixture about the exit guide, and against a wall of the deaerator such that air and oil are separated.

In another embodiment according to any of the previous embodiments, the separated oil enters the oil tank through a diffusor.

In another embodiment according to any of the previous embodiments, an inlet velocity to the deaerator is less than or equal to 14 feet/second, and an exit velocity from the deaerator of the separated air is less than or equal to 14 feet/second.

In another embodiment according to any of the previous embodiments, a deaerator exit delivers oil into the oil tank at least 2 inches (5.08 centimeters) below the minimum oil level within the tank.

In another embodiment according to any of the previous embodiments, a dwell time of oil in the tank as removed by the oil pump, on average, is five seconds or less.

In another embodiment according to any of the previous embodiments, the oil tank may hold greater than or equal to 25 and less than or equal to 35 quarts of oil.

In another embodiment according to any of the previous embodiments, the engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil.

In another embodiment according to any of the previous embodiments, the oil tank is associated with an engine having greater than or equal to 35,000 and less than or equal to 100,000 lbs in rated thrust at take-off.

In another embodiment according to any of the previous embodiments, the gear reduction includes a sun gear for driving intermediate gears. Oil baffles are located circumferentially between the intermediate gears.

In another embodiment according to any of the previous embodiments, an oil capture gutter surrounds the gear reduction.

In another embodiment according to any of the previous embodiments, an oil capture gutter surrounds the gear reduction.

In another embodiment according to any of the previous embodiments, the air exit from the oil tank passes around a deflector to remove oil that may still be mixed with the air.

In another embodiment according to any of the previous embodiments, the air exit includes a baffle extending away from an end of the deaerator, and toward the air outlet.

In another featured embodiment, a method of designing a gas turbine engine comprises providing a fan drive turbine for driving a gear reduction. The gear reduction drives a fan rotor. A lubrication system with an oil tank is provided to supply oil to the gear reduction. The lubrication system includes a lubricant pump. An air/oil mixture is supplied to an inlet of a deaerator. The deaerator includes a separator for separating oil and air, delivering separated air to an air outlet, and delivering separated oil back into an oil tank. The separated oil is first delivered into a pipe outwardly of the oil tank, and then into a location beneath a minimum oil level in the tank. Air within the oil tank moves outwardly through an air exit into the deaerator.

In another embodiment according to the previous embodiment, the deaerator has an air outlet, and an exit guide extending into the deaerator from the air outlet. The deaerator inlet delivers the air/oil mixture about the exit guide, and against a wall of the deaerator such that air and oil are separated.

In another embodiment according to any of the previous embodiments, the separated oil enters the oil tank through a diffusor.

In another embodiment according to any of the previous embodiments, the air exit from the oil tank passes around a deflector to remove oil that may still be mixed with the air.

In another embodiment according to any of the previous embodiments, the air exit includes a baffle extending away from an end of the deaerator, and toward the air outlet.

DETAILED DESCRIPTION

Figure 1:
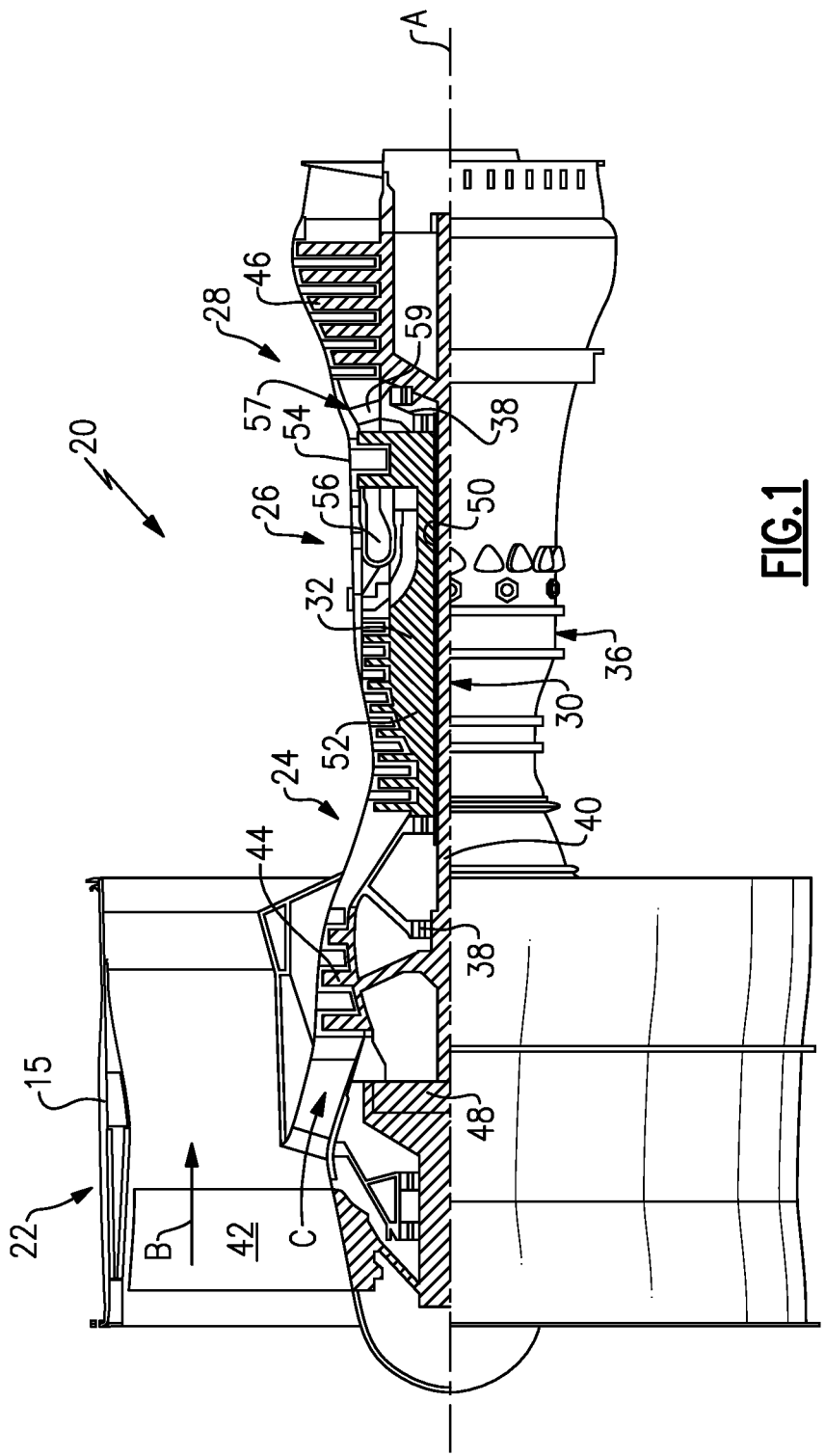
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than or equal to about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than or equal to about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
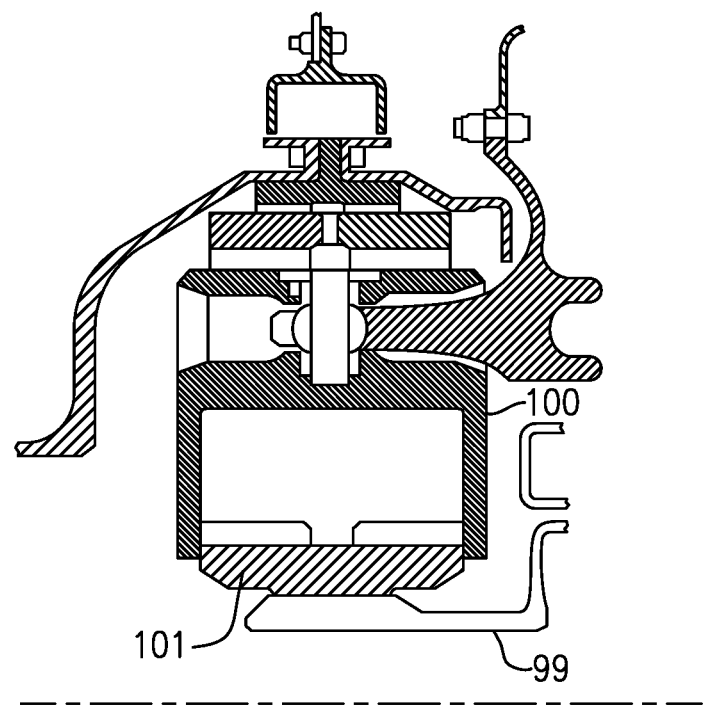
FIG. 2 shows a portion of a gear reduction.
Figure 2:
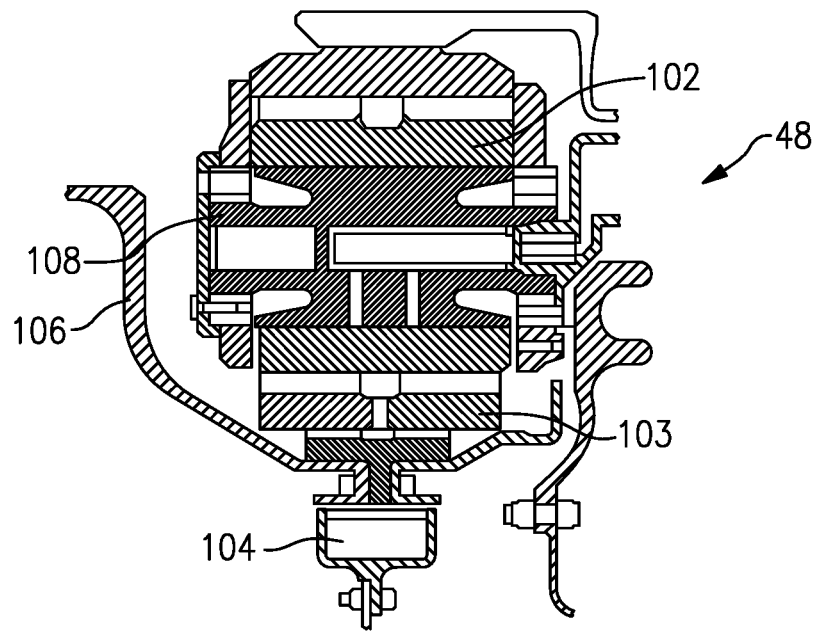

As shown in FIG. 2, a flexible shaft 99, which is driven by the turbine 46, drives a sun gear 101 which, in turn, engages and drives intermediate gears 102. In some embodiments, the intermediate gears 102 may be planet gears of a planetary epicyclic gear system. In other embodiments, the intermediate gears 102 may be star gears of a star epicyclic gear system. The intermediate gears 102 engage and drive a ring gear 103 to, in turn, drive an output shaft 106, which then drives the fan rotor 42. In other embodiments, a planetary gear carrier (not shown) driven by planetary gears may drive the fan shaft. Lubricant is supplied to a journal pin 108, to the intermediate gears 102 and to other locations within the gear reduction 48.

Figure 3:
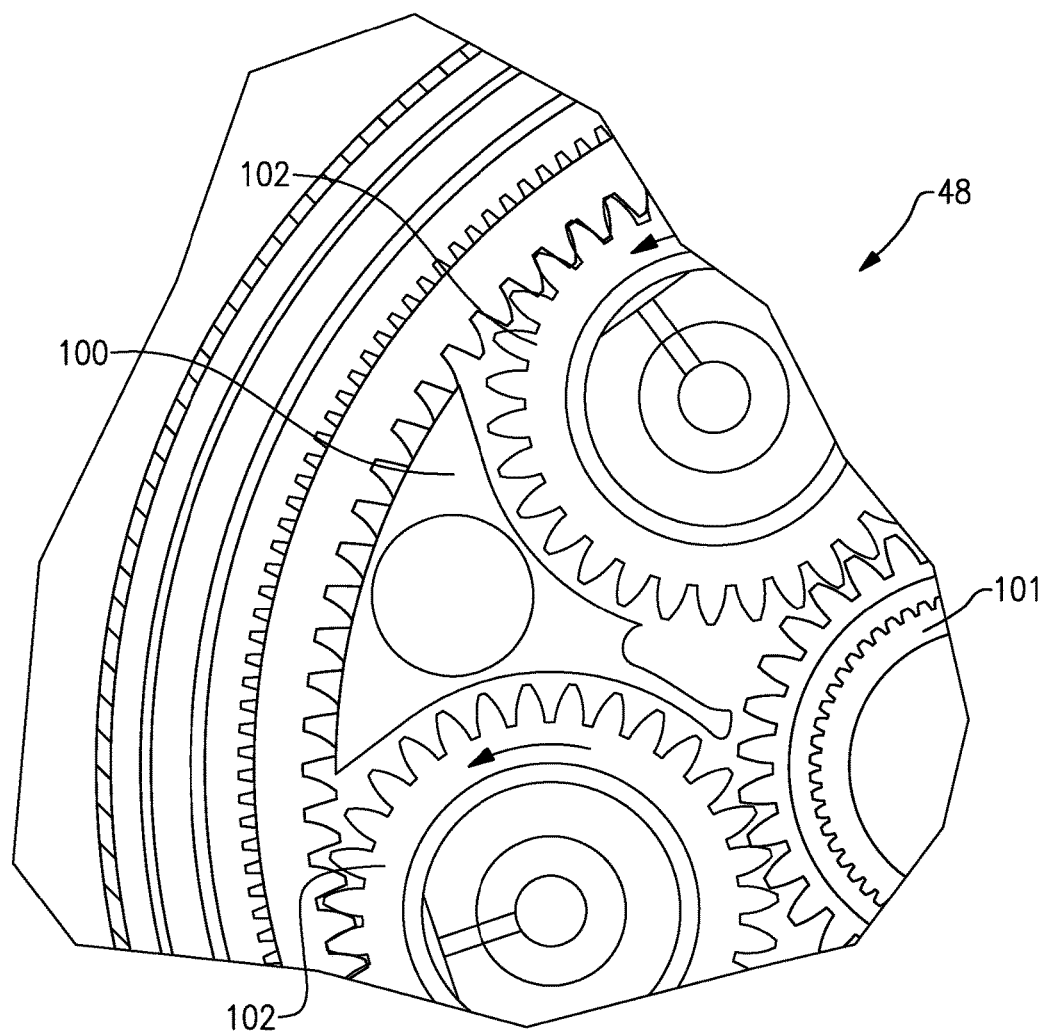
FIG. 3 shows another portion of a gear reduction.

FIG. 3 shows baffles 100 which are placed circumferentially between adjacent planet gears 102.

An oil capture gutter 104 (shown in FIG. 2) surrounds the gear reduction 48 and captures oil that has left the gear reduction. Oil from the gear reduction 48 is returned to a pump 72 (See FIG. 4) or a tank 90 as shown schematically in FIG. 4. As shown, a lubricant system 70 includes the gear reduction 48 which may be structured as shown in FIGS. 2 and 3. Notably, complete details of the operation of the baffle, the gutter and the other portions of the gear reduction may be as disclosed in U.S. Pat. No. 6,223,616, the disclosure of which with regard to the operation of the gear reduction is incorporated by reference.

Oil flows from an oil pump 72 to a filter 74 through a pressure relief valve 76 to an air/oil cooler 78 and then to a fuel/oil cooler 80. The oil may pass through an oil pressure trim orifice 82 and back to the tank 90. Alternatively, the oil may pass through a strainer 84 and then to the gear reduction 48. Oil returning from the gear reduction and, in particular, from the gutter, may pass back directly to the pump 72 or to the tank 90. This is a simplification of the overall lubricant system and, as appreciated, there may be other components.

Applicant has recognized that by utilizing baffles 100 and a gutter 104 on the gear reduction 48, which may be generally as disclosed in the above-mentioned U.S. Pat. No. 6,223,616, the oil need not sit in the oil tank for ten seconds in order to de-aerate. Thus, the size of the tank 90 may be made much smaller.

Conventional turbofans allow the oil to dwell in an oil tank for approximately 7-10 seconds. The dwell time allows air bubbles to separate from the oil to prevent foaming. With the move to a geared gas turbine engine, the oil flow volumes may effectively double. This would require a much larger oil tank, and as much as twice as large if the same dwell time is allowed. Thus, it becomes important to reduce dwell time.

Applicant has discovered that oil is de-aerated by the baffles 100 and gutter system and that a dwell time in the oil tank to remove air bubbles may be less than five seconds More preferably, it may be less than or equal to about 3.0 seconds. This allows the use of oil tank 90 to be of a size roughly equivalent to the size utilized in prior non-geared gas turbine engines. A deaerator 88 is shown incorporated into the oil tank 90.

The better the deaeration before the oil reaches the tank, the shorter the dwell time that can be achieved. The disclosed deaerator achieves these very low dwell times.

As an example, an oil tank that holds 25 to 35 quarts of oil may be utilized on a geared gas turbine engine with 15,000 to 35,000 lbs in rated thrust at take-off. Further, an oil tank may be 35 quarts to 50 quarts of oil for an engine with 35,000 to 100,000 lbs in rated thrust at take-off.

Figure 4:
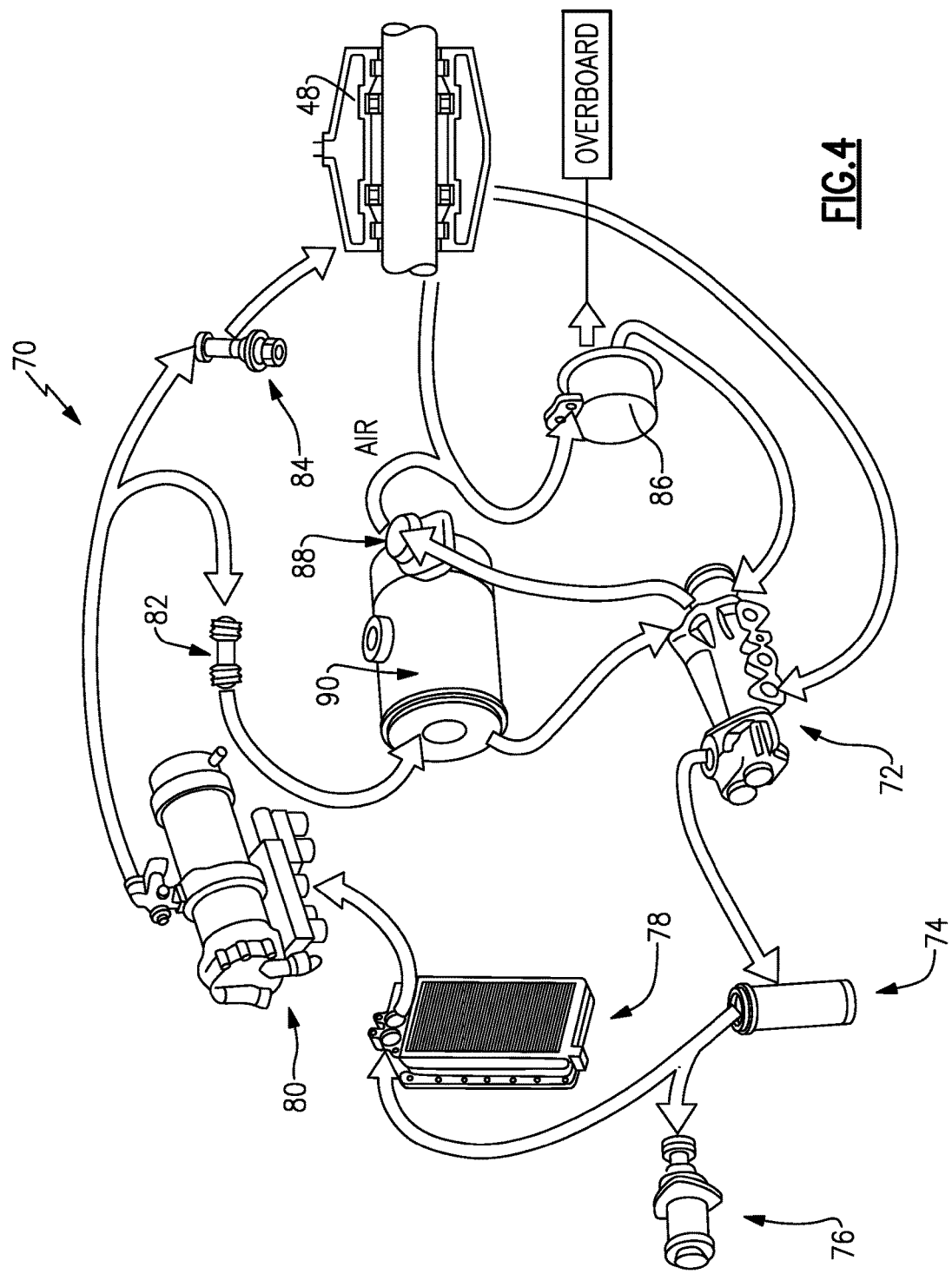
FIG. 4 shows a lubrication system.
Figure 5:
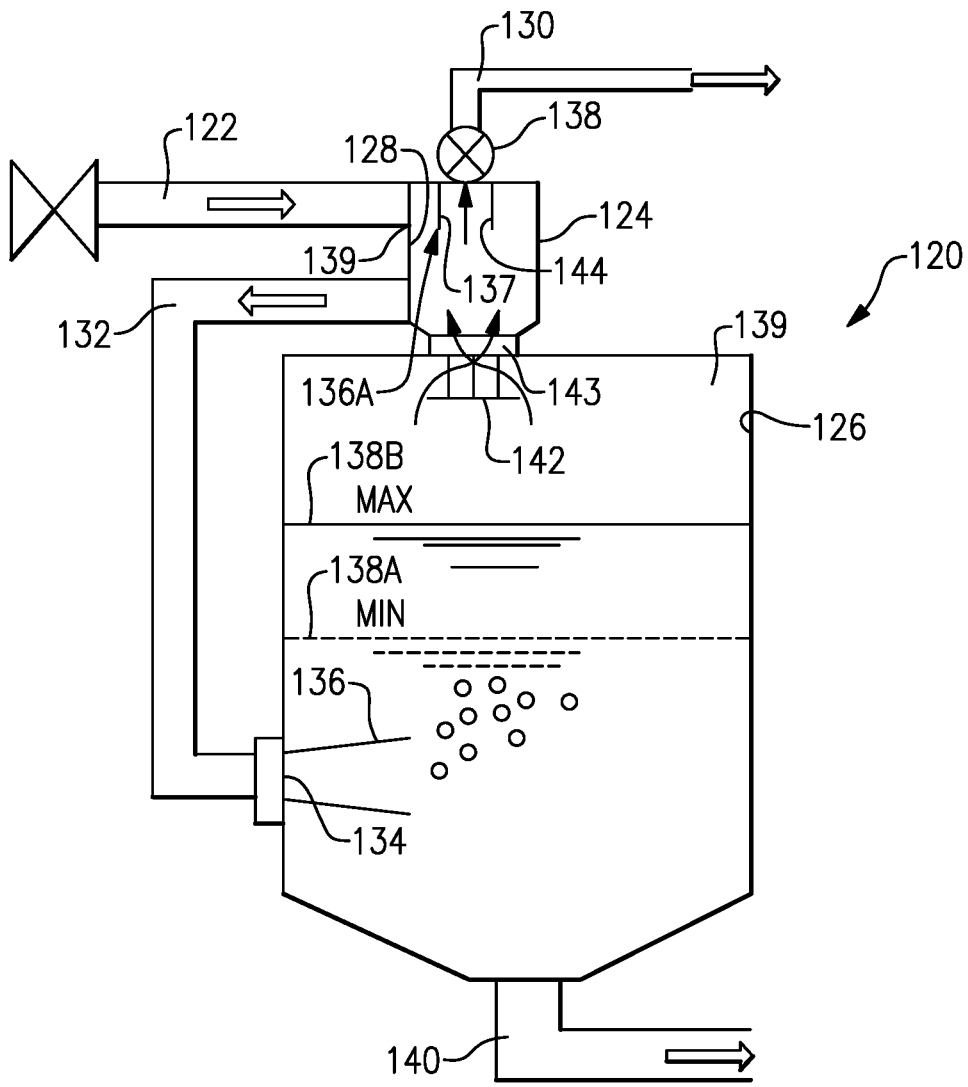
FIG. 5 shows a deaerator.

FIG. 5 shows a deaerator 124, and an oil tank 126, shown as an assembly 120. This assembly may be incorporated into the circuit of FIG. 4.

A mixed air and oil inlet line 122 enters into an interior 128 of the deaerator 124. This flow is at an inlet velocity less than or equal to 14 feet/second. Oil is separated, and flows outwardly of a bottom pipe 132 and into an inlet 134 within the oil tank 126. As shown, a conical diffuser 136 guides the oil flow into an oil level in the tank 126. There is a minimum oil level 138*a* and a maximum oil level 138*b* illustrated. Notably, a vertical location of the outlet 134 is at least 2 inches (5.08 centimeters) beneath the minimum oil level 138*a*.

Applicant has found that introducing the oil and air mixture into the oil tank is much "quieter," resulting in less re-aeration when it is delivered at least 2 inches (5.08 centimeters) below the free surface of the oil. As an example, if oil were sprayed onto the free surface, this could cause splashing and foaming.

An oil exit velocity leaving the pipe 132 and into the exit 134 may be less than 14 feet/second. High velocity oil and oil mixtures entering the tank may cause re-aeration. The 14 feet/second reduces the chances of re-aeration. In addition, the amount of oil as a percentage of the overall fluid entering the inlet 122 is greater than 5%, and the amount of air leaving the deaerator 124 through the external tube 130 will be less than 5%.

Air may still be entrained in the oil entering the outlet 134. This is illustrated by bubbles within the oil level. That air will move upwardly into an empty volume 139, and eventually pass around a deflector 142 in an air exit opening 143, and reenter the deaerator 124. This air will largely separate from the oil in the deaerator 124, passing to an exit guide 136A, through a breather valve 138, and leave through the breather tube 130. This flow is also at a velocity less than or equal to 14 feet/second.

Figure 6:
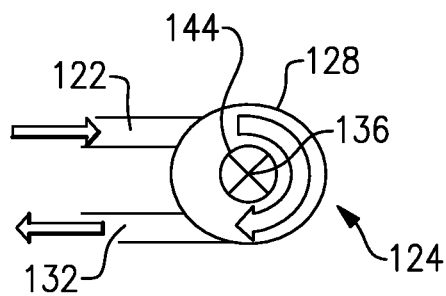
FIG. 6 is a schematic view of flow within the deaerator.

FIG. 6 shows the detail of the deaerator 124. The inlet 122 passes around the breather guide 144, against an opposed wall of the interior 128. This assists the air in separating and passing through outlet 130, and the oil separating and falling downwardly to pass into the pipe 132.

Returning to FIG. 5, it can be appreciated that a vertically lower end 137 of the exit guide 136A is vertically below a vertically lower end 139 of the inlet. Stated another way, the end 137 is spaced further toward a remote wall of the deaerator 124 than is the end 139 of the inlet tube 122. This ensures the mixed air and oil will largely pass around or against the exit guide, and less oil will be entrained upwardly to the air outlet 130.

Figure 7:
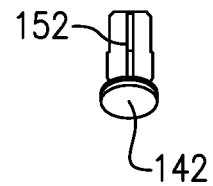
FIG. 7 shows a detail of an air escape.

FIG. 7 shows further details of the air outlet, including the deflector 142, and the vanes 152.

Figure 8A:
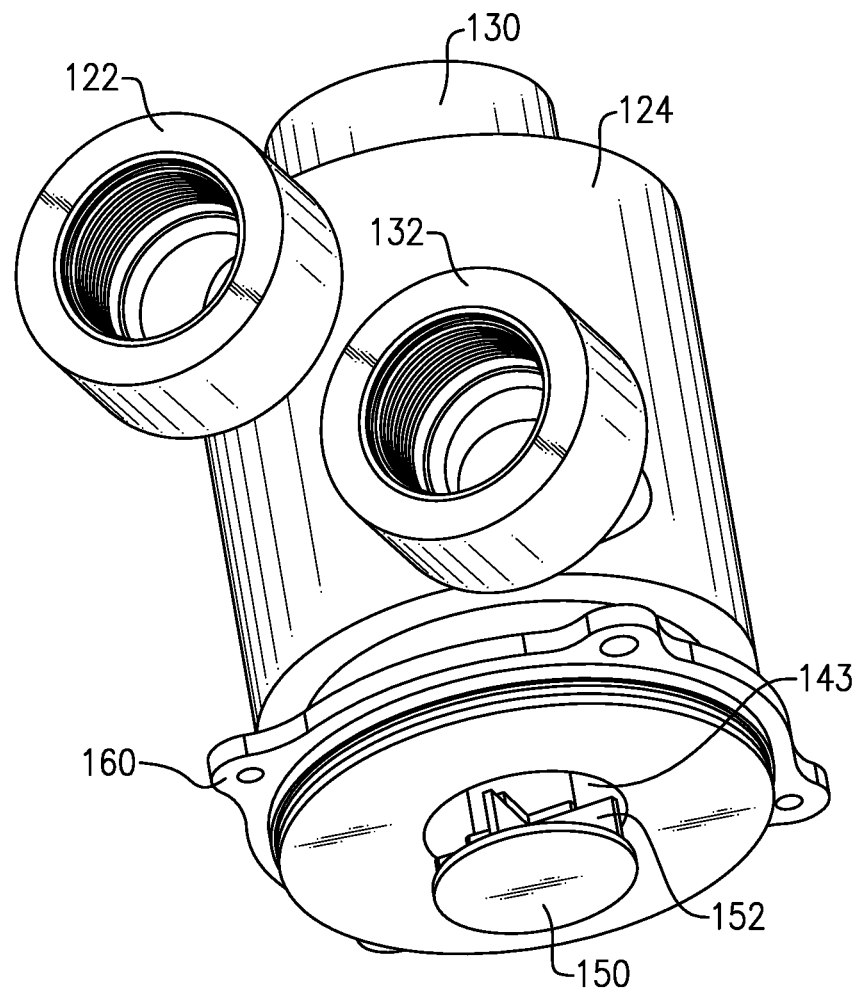
FIG. 8A shows a first external view of the deaerator.

FIG. 8A is a perspective view of the deaerator 124. As can be appreciated, there is the inlet 122, the oil outlet 132 and the air outlet 130. A mounting base 160 is illustrated, as is the opening 143, guide vanes 152, and deflector 150.

Figure 8B:
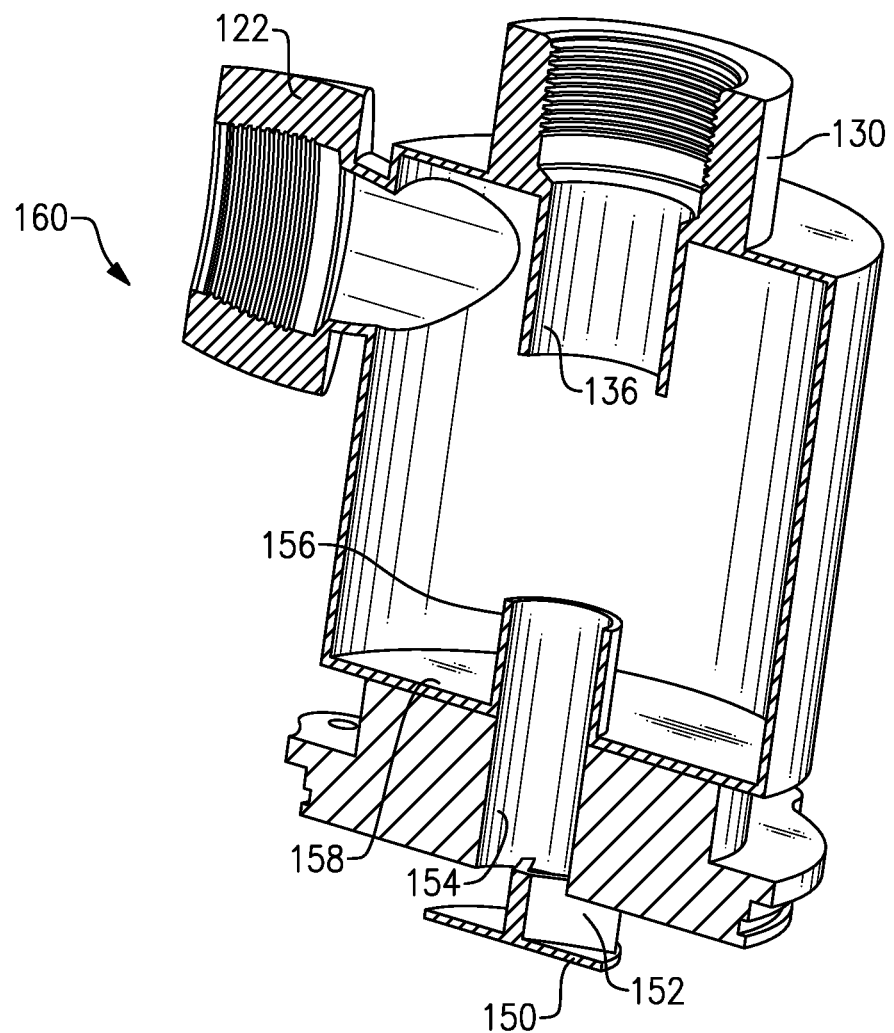
FIG. 8B is a cross-section through the deaerator.

FIG. 8B shows a distinct embodiment 160. In embodiment 160, the air inlet opening 154 extends upwardly to an inner end 156 which is spaced away from a base wall 158.

Otherwise, the deaerator 160 is similar to the prior disclosed deaerator.

Figure 8C:
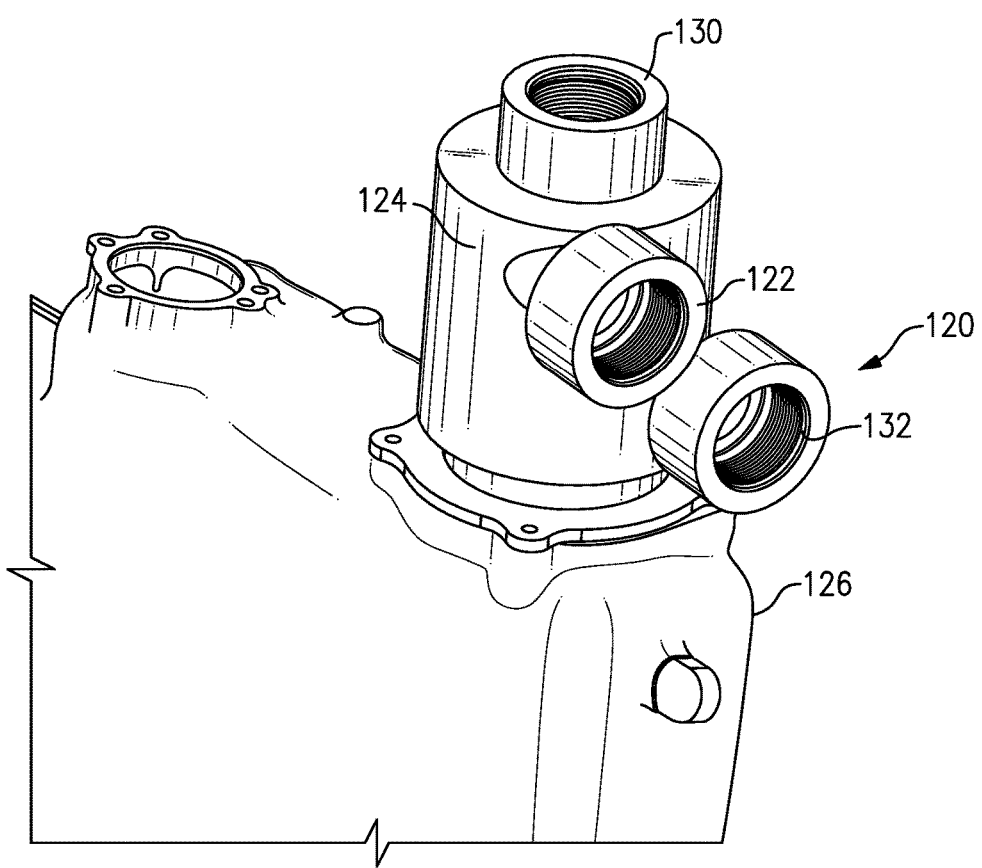
FIG. 8C shows the deaerator mounted on an oil tank.

FIG. 8C shows the assembly 120 of the deaerator 124 mounted on the oil tank 126.

Returning to FIG. 5, oil can pass from the oil tank 126 through the pipe 140 to the oil pump, or for other uses of the oil in the FIG. 4 circuit.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a fan drive turbine driving a gear reduction, said gear reduction driving a fan rotor; and
    a lubrication system supplying oil to said gear reduction, the lubrication system including a lubricant pump supplying an air/oil mixture to an inlet of a deaerator, said deaerator including a separator for:
    separating oil and air,
    delivering separated air to an air outlet, and
    delivering separated oil back into an oil tank,
    wherein said separated oil is first delivered into a pipe outwardly of the oil tank, and then into a location beneath a minimum desired oil level in the oil tank,
    wherein air within the oil tank moves outwardly through an air exit into the deaerator;
    an exit velocity from the deaerator of the separated air is less than or equal to 14 feet/second;

wherein said pipe includes a pipe outlet at least 2 inches (5.08 centimeters) below the minimum oil level but above an inset to an oil supply pipe within the tank; and wherein a dwell time of oil the oil tank as removed by said oil pump, on average, is five seconds or less.

2. The gas turbine engine as set forth in claim 1, wherein the deaerator has an air outlet, and an exit guide extending into the deaerator from the air outlet, and the deaerator inlet delivering the air/oil mixture about the exit guide, and against a wall of the deaerator such that air and oil are separated.

3. The gas turbine engine as set forth in claim 1, wherein the separated oil enters the oil tank through a diffusor.

4. The gas turbine engine as set forth in claim 1, wherein an inlet velocity of said air/oil mixture to the deaerator is less than or equal to 14 feet/second.

5. The gas turbine engine as set forth in claim 1, wherein said oil tank may hold greater than or equal to 25 and less than or equal to 35 quarts of oil.

6. The gas turbine engine as set forth in claim 5, wherein said gear reduction includes a sun gear for driving intermediate gears and there being oil baffles located circumferentially between said intermediate gears.

7. The gas turbine engine as set forth in claim 6, wherein an oil capture gutter surrounds said gear reduction.

8. The gas turbine engine as set forth in claim 5, wherein said engine is rated greater than or equal to 15,000 and less than or equal to 35,000 lbs in rated thrust at take-off.

9. The gas turbine engine as set forth in claim 1, wherein said oil tank holds greater than or equal to 35 and less than or equal to 50 quarts of oil.

10. The gas turbine engine as set forth in claim 9, wherein said oil tank is associated with an engine having greater than or equal to 35,000 and less than or equal to 100,000 lbs in rated thrust at take-off.

11. The gas turbine engine as set forth in claim 1, wherein an oil capture gutter surrounds said gear reduction.

12. The gas turbine engine as set forth in claim 1, wherein the air exit from the oil tank passes around a deflector to remove oil that may still be mixed with the air.

13. The gas turbine engine as set forth in claim 12, wherein the air exit includes a baffle extending away from an end of the deaerator, and toward the air outlet.

14. A method of designing a gas turbine engine comprising:

providing a fan drive turbine for driving a gear reduction, said gear reduction for driving a fan rotor; and providing a lubrication system for supplying oil to said gear reduction, with an oil tank, the lubrication system including a lubricant pump; and supplying an air/oil mixture to an inlet of a deaerator, said deaerator including a separator for:

separating oil and air, delivering separated air to an air outlet, and delivering separated oil back into an oil tank, wherein said separated oil is first delivered into a pipe outwardly of the oil tank, and then into a location beneath a minimum oil level in the oil tank, the pipe having a pipe inlet, a pipe outlet, and a pipe midportion located therebetween, the pipe midportion is spaced apart and outwardly from the oil tank, wherein air within the oil tank moves outwardly through an air exit into the deaerator, and an exit velocity from the deaerator of the separated air is less than or equal to 14 feet/second, and an inlet velocity of the air/oil mixture to the deaerator is less than or equal to 14 feet/second.

15. The method as set forth in claim 14, wherein said pipe includes the pipe outlet at least 2 inches (5.08 centimeters) below the minimum oil level but above an inlet to an oil supply pipe within the tank.

16. The method as set forth in claim 15, wherein a dwell time of oil in the tank as removed by said oil pump, on average, is five seconds or less.

17. The method as set forth in claim 14, wherein an oil capture gutter surrounds said gear reduction.

18. A gas turbine engine comprising:

a fan drive turbine driving a gear reduction, said gear reduction driving a fan rotor; and a lubrication system supplying oil to said gear reduction, the lubrication system including a lubricant pump supplying an air/oil mixture to an inlet of a deaerator, said deaerator including a separator for:

separating oil and air, delivering separated air to an air outlet, and delivering separated oil back into an oil tank, wherein said separated oil is first delivered into a pipe outwardly of the oil tank, and then into a location beneath a minimum desired oil level in the oil tank, the pipe having a pipe inlet, a pipe outlet, and a pipe midportion located therebetween, the pipe midportion is spaced apart and outwardly from the oil tank, wherein air within the oil tank moves outwardly through an air exit into the deaerator; an exit velocity from the deaerator of the separated air is less than or equal to 14 feet/second; and wherein a dwell time of oil in the oil tank as removed by said oil pump, on average, is five seconds or less.

19. The gas turbine engine as set forth in claim 18, wherein said pipe includes the pipe outlet at least 2 inches (5.08 centimeters) below the minimum oil level but above an inlet to an oil supply pipe within the tank.

* * * * *